(12) United States Patent
Yamashita et al.

(10) Patent No.: US 8,225,917 B2
(45) Date of Patent: Jul. 24, 2012

(54) FLUID COUPLING AND COUPLING METHOD THEREOF

(75) Inventors: Toshiya Yamashita, Toyota (JP); Yuji Hattori, Susono (JP); Tomoaki Yanagida, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 772 days.

(21) Appl. No.: 12/438,550

(22) PCT Filed: Aug. 23, 2007

(86) PCT No.: PCT/JP2007/066822
§ 371 (c)(1),
(2), (4) Date: Feb. 24, 2009

(87) PCT Pub. No.: WO2008/023838
PCT Pub. Date: Feb. 28, 2008

(65) Prior Publication Data
US 2010/0230225 A1 Sep. 16, 2010

(30) Foreign Application Priority Data
Aug. 24, 2006 (JP) .................................. 2006-228195

(51) Int. Cl.
*F16D 33/18* (2006.01)
(52) U.S. Cl. ..................................................... 192/3.29
(58) Field of Classification Search ...................... 60/338
See application file for complete search history.

(56) References Cited

U.S. PATENT DOCUMENTS

| 5,348,127 A | 9/1994 | Murata et al. |
| 5,566,801 A | 10/1996 | Fukunaga et al. |
| 6,223,872 B1 | 5/2001 | Heller et al. |
| 6,231,472 B1 | 5/2001 | Sudau et al. |

(Continued)

FOREIGN PATENT DOCUMENTS

CN 1727729 A 2/2006

(Continued)

OTHER PUBLICATIONS

Chinese Office Action issued May 25, 2011, in Patent Application No. 200780031333.9 (with English-language translation).

*Primary Examiner* — Edwin A Young
(74) *Attorney, Agent, or Firm* — Oblon, Spivak, McClelland, Maier & Neustadt, L.L.P.

(57) ABSTRACT

In a fluid coupling wherein a turbine shell is welded to a turbine hub, it is necessary to take care of the strength of the welded portion because the turbine shell is displaced toward the pump blade as the torque thereof is transmitted. A fluid coupling (10) according to the present invention is provided with an input-side rotary constituent (A) including a pump blade (18), to which is attached an input member, and an output-side rotary constituent (B) including a turbine shell (22), to which is attached a turbine blade (21) opposed to the pump blade (18), and a turbine hub, to which is coupled an output member (1), the turbine hub (15) being welded to an inner peripheral portion of the turbine shell (22), wherein the turbine shell (22) and the turbine hub (15) have contact surfaces (23, 24), respectively, extending along a rotational axis (10a) of the fluid coupling (10), and a joint portion (14) is formed by the welding on the contact surfaces (23, 24) closer to the pump blade (18).

12 Claims, 5 Drawing Sheets

U.S. PATENT DOCUMENTS 6,325,191 B1 * 12/2001 Meisner et al. ............. 192/3.29
2004/0001756 A1    1/2004 Takabayashi

FOREIGN PATENT DOCUMENTS

| JP | 5 126232   | 5/1993  |
|----|------------|---------|
| JP | 7 248053   | 9/1995  |
| JP | 2000 154863| 6/2000  |
| JP | 2001 514366| 9/2001  |
| JP | 2001 311460| 11/2001 |
| JP | 2003 336719| 11/2003 |

* cited by examiner

US 8,225,917 B2

FLUID COUPLING AND COUPLING METHOD THEREOF

TECHNICAL FIELD

The present invention relates to a fluid coupling in which an inner peripheral portion of a turbine shell is welded to a turbine hub, and a method for joining the turbine shell to the turbine hub.

BACKGROUND ART

To minimize the size of a torque converter for a vehicle and/or reducing the weight thereof, the method of connecting constituent elements of the torque converter can be changed from fastening members such as rivets or other similar devices to a method using brazing or welding. For example, in Japanese Patent Laid-Open No. 2001-311460, a fluid coupling is disclosed, wherein a turbine shell is welded to a turbine hub, and a welded portion is shown in an enlarged view in FIG. 5. That is, at an outer peripheral portion of the turbine hub 101 having an inner peripheral portion which is connected with an input shaft of a gear box (not shown) by using a spline joint, a boss 103 having an annular stopper 102 projected from an outer peripheral edge of a turbine hub 101 is formed. A turbine shell 104 having a turbine blade (not shown) mounted thereon at the outer peripheral portion thereof is inserted into the boss so that the inner peripheral portion thereof abuts the stopper 102, whereby a fillet welding portion 105 is formed between the outer peripheral surface of the stopper 102 and an end surface of the turbine shell 104.

In the fluid coupling including a torque converter, fluidic pressure is generated to bring the turbine shell closer to a pump blade to provide torque transmission. Thereby, as the transmission torque of the fluid coupling increases, the turbine shell on which the turbine blade is mounted elastically deforms toward the turbine blade. That is, in the conventional fluid coupling illustrated in FIG. 5, a force to displace the turbine shell 104 toward the pump blade (not shown, on the left side of the drawing) is applied to this turbine shell 104 as the torque is transmitted. Usually, since the left and right directional displacement of the turbine hub 101 in the fluid coupling in the drawing is restricted by a thrust bearing (not shown), a bending moment acts on the turbine shell 104 so that it moves leftward in the drawing about a center defined by a joint portion thereof to the turbine hub 101. As a result, there is a possibility that a tensile stress will act on the fillet welding portion 105 between the turbine hub 101 and the turbine shell 104 to deteriorate the bonding strength thereof.

DISCLOSURE OF THE INVENTION

An object of the present invention is to provide a fluid coupling in which the strength of a joint portion between the turbine shell and the turbine hub does not deteriorate when the turbine shell is displaced toward the pump blade as the torque of the fluid coupling is transmitted, and a method for joining the turbine shell to the turbine hub in such a fluid coupling.

A first aspect of the present invention is a fluid coupling comprising an input-side rotary element coupled to an input member and including a pump blade, and an output-side rotary element including a turbine shell having a turbine blade attached thereto and opposed to the pump blade, and a turbine hub coupled to an output member, the turbine hub being welded to an inner peripheral portion of the turbine shell, wherein the turbine shell and the turbine hub have contact surfaces, respectively, extending along a rotational axis of the fluid coupling, and wherein a weld joint portion is formed on the contact surfaces closer to the pump blade.

In the present invention, as the torque is transmitted by the fluid coupling, a hydraulic pressure is generated therein to move the turbine shell toward the pump blade. A bending moment acts on an inner peripheral portion of the turbine shell to which the turbine blade is attached, so that the outer periphery of the turbine shell approaches the pump blade. In this case, a compression stress is applied to the welded portion between the turbine hub and the turbine shell.

According to the first aspect of the present invention, even if the bending moment acts on the turbine shell to bring the turbine shell closer to the turbine blade as the torque is transmitted, the compression stress is applied to the welded portion between the turbine hub and the turbine shell, whereby deterioration of the bonding strength is avoidable.

A second aspect of the present invention is a fluid coupling comprising an input-side rotary element which is coupled with an input member including a pump blade, and an output-side rotary element including a turbine shell having a turbine blade attached thereto and opposed to the pump blade, and a turbine hub coupled to an output member, the turbine shell being coupled to the turbine hub via a joint portion, wherein the turbine shell is welded to the turbine hub so that the joint portion receives a compression stress when the turbine shell is displaced toward the pump blade as torque is transmitted by the fluid coupling.

According to the second aspect of the present invention, since the turbine shell is welded to the turbine hub so that the joint portion receives the compression stress when the turbine shell is displaced toward the pump blade as the torque is transmitted by the fluid coupling, deterioration of the bonding strength is avoidable.

In the fluid coupling of the first or second aspect of the present invention, the turbine shell may have a boss at an inner peripheral portion thereof, the boss extending in a direction parallel to the rotational axis of the fluid coupling; an inner peripheral surface of the boss defining the contact surface, and the turbine hub may have an annular groove at an outer peripheral portion thereof, the boss being inserted into the annular groove; inner peripheral surface of the annular groove defining the contact surface. Or, the turbine shell may have a boss at an inner peripheral portion thereof, extending in a direction parallel to the rotational axis of the fluid coupling; an inner peripheral surface of the boss defining the contact surface, and the turbine hub may have a rib at the outer peripheral portion thereof, extending in the direction parallel to the rotational axis of the fluid coupling; an outer peripheral surface of a the rib defining the contact surface. Similarly, the turbine shell may have a boss at an inner peripheral portion thereof, the boss being diametrically inclined inward relative to the rotational axis of the fluid coupling; an inner peripheral surface of the boss defining the contact surface, and the turbine hub may have a rib at an outer peripheral portion thereof, the rib being diametrically inclined outward relative to the rotational axis of the fluid coupling; an outer surface of the rib defining the contact surface. In either case, the turbine shell preferably extends from the boss on a part thereof closer to the pump blade while being inclined diametrically outward.

The fluid coupling may further comprises a lockup clutch including a lockup piston coupled to the output-side rotary element, a the lockup clutch capable of being actuated by the lockup piston to engage the input-side rotary element integral therewith out intervening fluid. In this case, the input-side rotary element and the output-side rotary element may be mechanically engaged with each other without the intervention of a working fluid. The fluid coupling may further comprises a damper having first rotary element coupled to the turbine hub, second rotary element coupled to the lockup piston to be rotatable relative to the first rotary element, and an elastically deformable member incorporated bridging the first and second rotary elements to allow the relative rotation of the first and second rotary elements so that elastic deformation occurs by the relative rotation. In this case, it is possible to absorb the torque variation coming from the input member by the damper when the lockup clutch is engaged, whereby a smoother rotary driving force is transmitted to the output member.

A third aspect of the present invention is a method for connecting an inner peripheral portion of a turbine shell of a fluid coupling to an outer peripheral portion of a turbine hub of the fluid coupling. The fluid coupling comprises an input-side rotary element which is coupled with an input member including a pump blade, and an output-side rotary element including a turbine shell having a turbine blade attached thereto and opposed to the pump blade, and a turbine hub coupled with an output member, the method comprising a step of welding the turbine shell to the turbine hub so that a joint portion between the inner peripheral portion of the turbine shell and the outer peripheral portion of the turbine hub receives a compression stress when the turbine shell is displaced toward the pump blade as torque is transmitted by the fluid coupling. According to the method for connecting the turbine shell to the turbine hub of the third aspect of the present invention, since the joint portion between the inner peripheral portion of the turbine shell and the outer peripheral portion of the turbine hub is welded to receive the compressed stress when the turbine shell is displaced toward the pump blade as the torque of the fluid coupling is transmitted, the strength of the welded portion is not decreased even if a bending moment acts on the turbine shell to bring the turbine shell closer to the turbine blade.

BEST MODE FOR CARRYING OUT THE INVENTION

Figure 1:
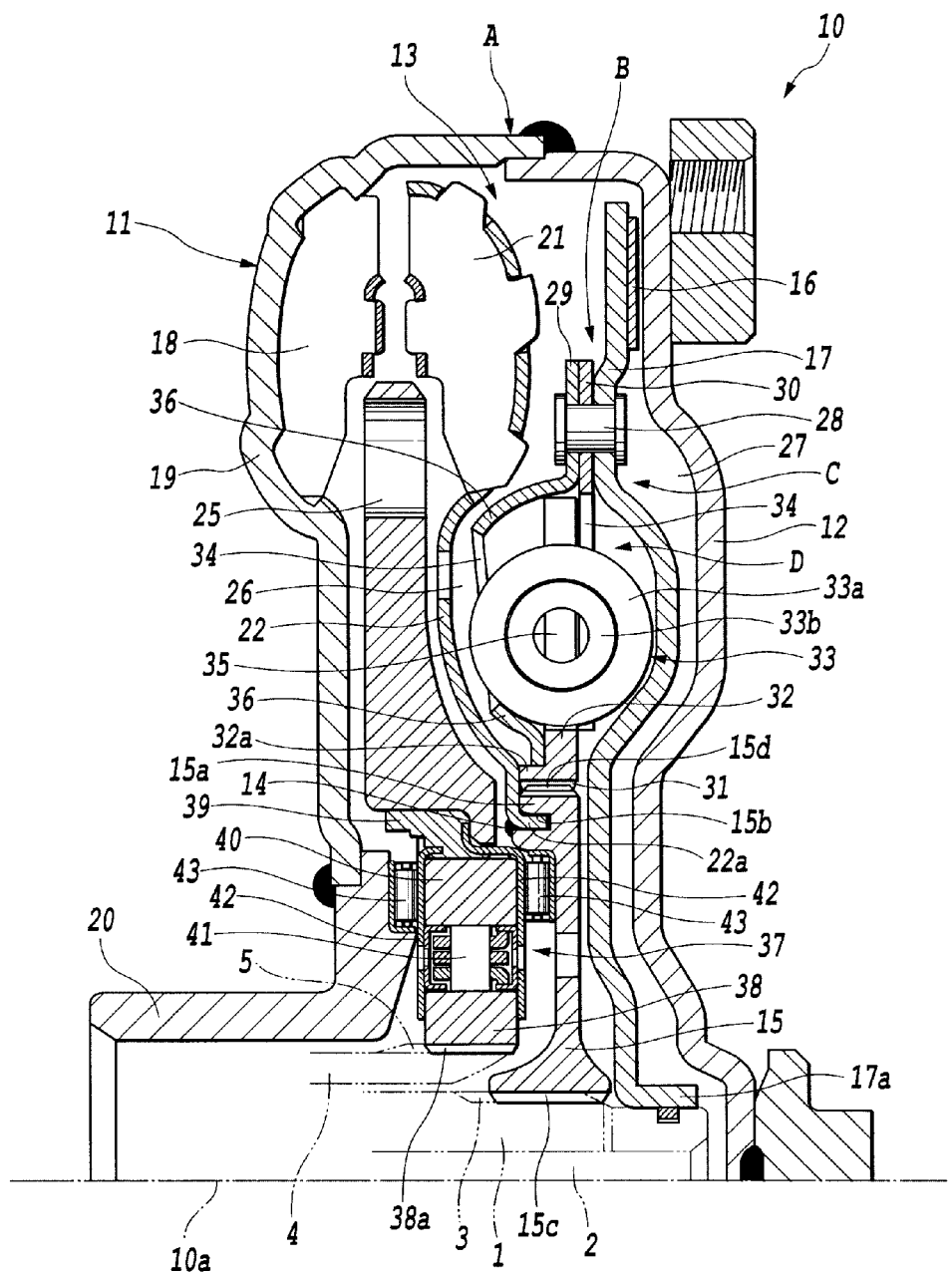
FIG. 1 is a cross-sectional view showing an inner structure of an embodiment wherein a coupling structure according to the present invention to an output member is applied to a coupling portion between a torque converter and an automatic transmission for a vehicle, wherein only an upper half thereof (an upper half in the drawing) is illustrated.
Figure 2:
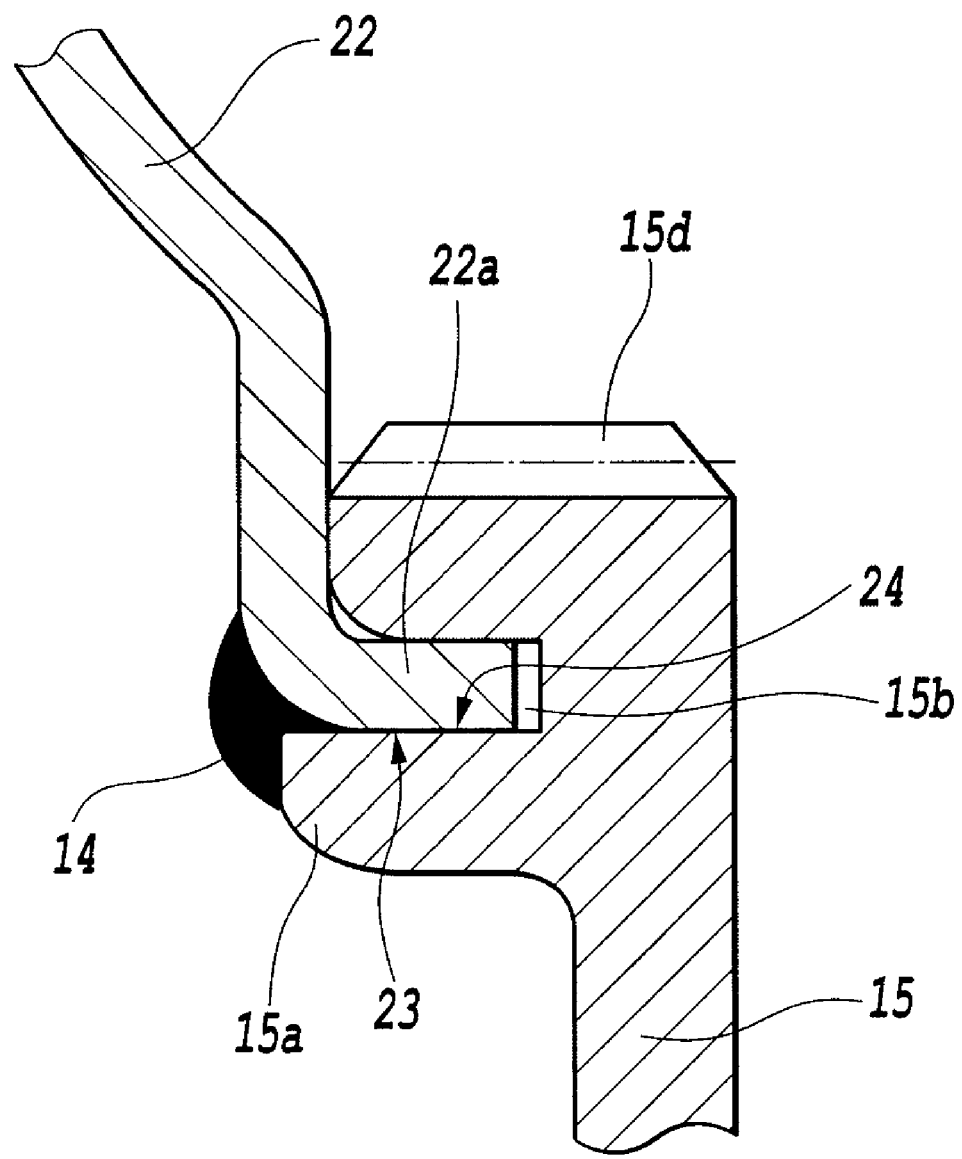
FIG. 2 is an extracted enlarged cross-sectional view of a welded portion between the turbine shell and the turbine hub according to the embodiment illustrated in FIG. 1.

An embodiment of a fluid coupling according to the present invention applied to a torque converter including a lockup clutch for a vehicle will be described in detail with reference to FIG. 1 representing a cross-sectional structure (an upper half) thereof and FIG. 2 which is an extracted enlarged view of a joint portion between a turbine shell and a turbine hub. The present invention is, however, not limited to such an embodiment but includes all variations and modifications of a concept in the present invention defined by claims, and, of course, applicable to any other techniques belonging to a spirit of the present invention.

The torque converter 10 in this embodiment is provided with an input-side rotary element A including a pump impeller 11 and a front cover 12, an output-side rotary element B including a turbine runner 13 and a turbine hub 15 integrally coupled to the turbine runner 13 via a joint portion 14, a lockup clutch C including a lockup piston 17 with a frictional plate 17 attached at an outer peripheral portion thereof abutted to the front cover 12, and a damper D disposed between the lockup piston 17 of the lockup clutch C and the turbine hub 15 in the output-side rotary hub 15.

The above-described pump impeller 11 has a blade 18 and an annular pump shell 19 with the blade 18 mounted on the inside thereof. In addition to the pump impeller 11, the input-side rotary element A further includes the front cover 12 joined to the pump shell 19 on the outer periphery thereof. An input member driving plate is coupled to a crankshaft (not shown) and is screwed thereto, and an extension sleeve 20 having an outer periphery in contact with the inner periphery of the pump shell 19.

The turbine runner 13 of the output-side rotary element B has blades 21 opposed to the pump impeller 11 and a turbine shell 22 for holding these blades 21. At an inner peripheral portion of this turbine shell 22, a boss 22a includes an inner surface defining a contact surface 23 which projects toward the turbine hub 15 in parallel to a rotational axis 10a of the torque converter 10. At an outer peripheral portion of the turbine hub 15, a rib 15a is formed to project toward the pump blade 18; i.e., toward a stator 25; in parallel to the rotational axis of the torque converter 10. Furthermore, on the part of the rib 15a closer to the pump blade 18; i.e., on an end surface closer to the stator 25; an annular groove 15b is formed in parallel to the rotational axis 10a of the torque converter 10 to hold the boss 22a of the turbine shell 22, and the inner peripheral wall thereof defines a contact surface 24. The boss 22a of the turbine shell 22 is inserted into the groove 15b of the turbine hub 15, and contact surfaces 24 and 23 of the turbine hub 15 and the turbine shell 22, respectively, extending in a direction parallel to the rotational axis 10a of the torque converter 10. The turbine hub 15 and the turbine shell 22 are brought into contact with each other and integrally joined together via the joint portion 14. The joint portion 14 is formed by a method such as laser welding or metal inert gas welding on the part of an open end of the groove 15b; i.e., at an end of the contact surfaces 23 and 24 closer to a stator 25 described later. The width and a dimension of the groove 15b are not necessarily defined so that the boss 22a is tightly engageable with the groove 15b, but a gap may be formed between the outer peripheral wall of the boss 22a and that of the groove 15b.

When the outer periphery of the boss 22 is elastically deformed toward the blade 18 of the pump impeller 11 as torque is transmitted in the torque converter, a compression stress acts on the joint portion due to the above-described structure of the joint portion 14. Thereby, even if the outer periphery of the turbine shell 22 is elastically deformed toward the blade 18 of the pump impeller 11, it is possible in advance to prevent the strength of the joint portion 14 from being degraded.

Figure 3:
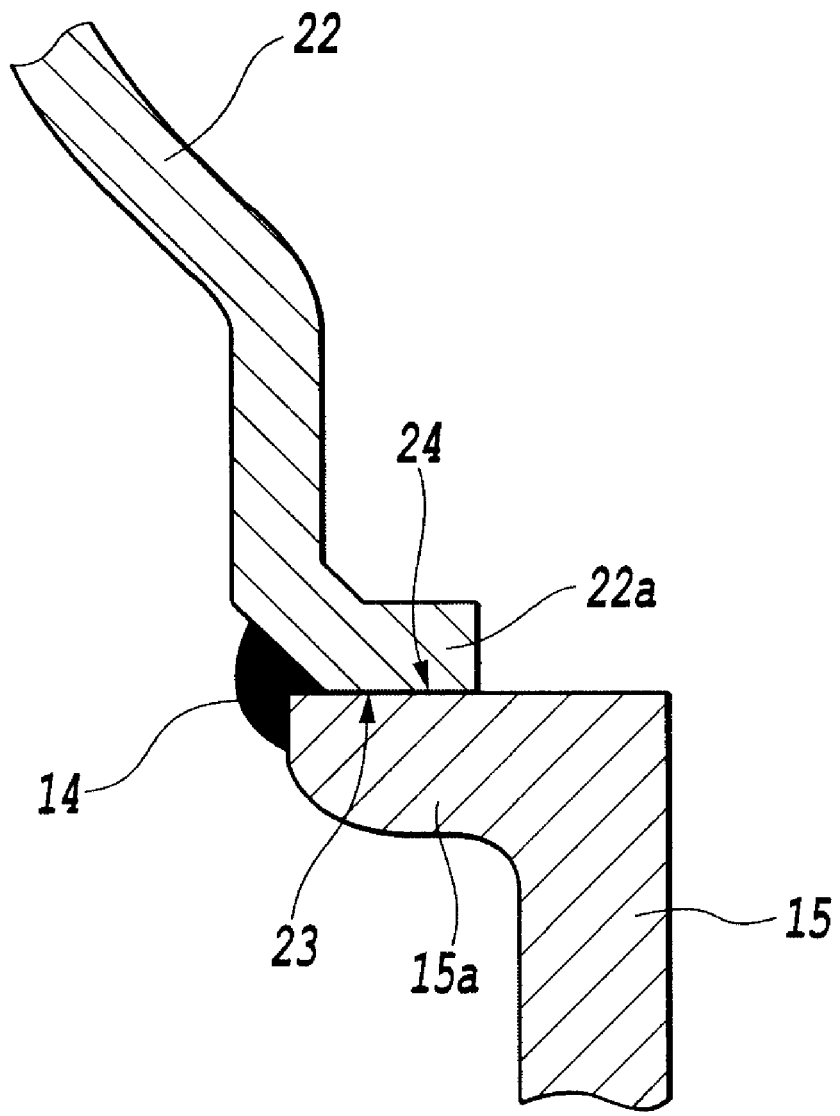
FIG. 3 is an extracted enlarged cross-sectional view of a welded portion between the turbine shell and the turbine hub according to another embodiment of the present invention.
Figure 4:
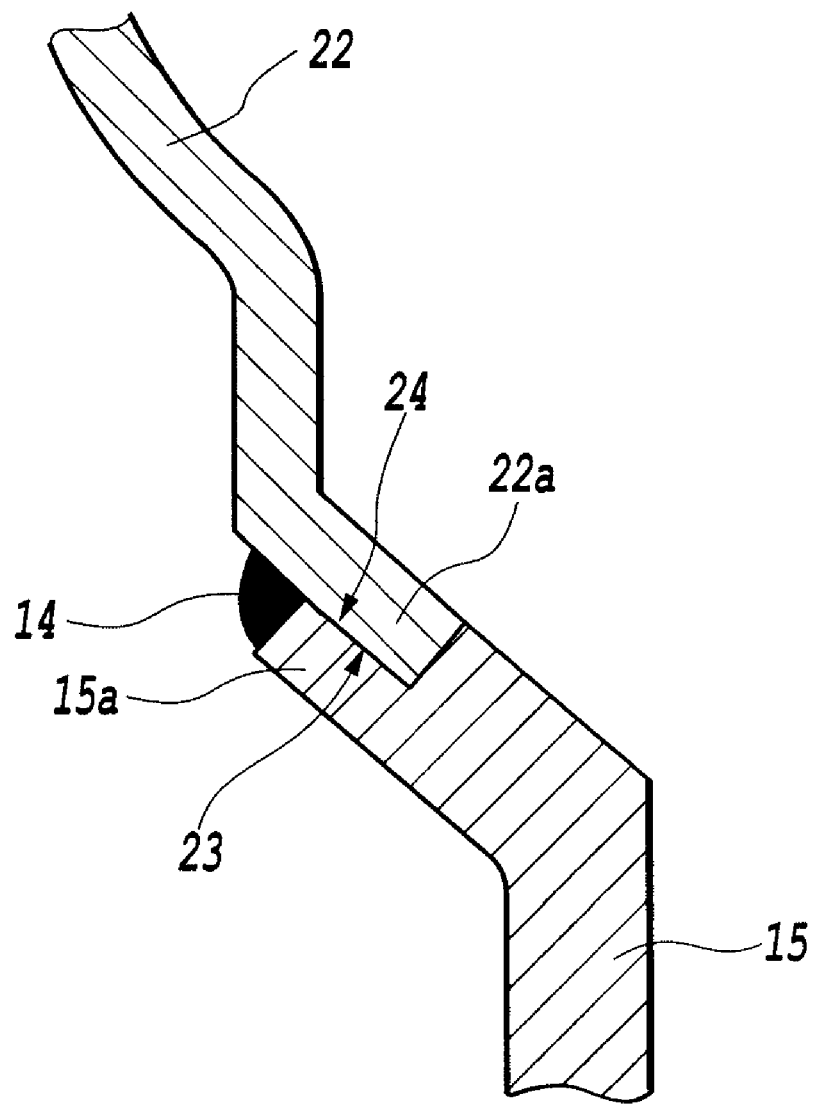
FIG. 4 is an extracted enlarged cross-sectional view of a welded portion between the turbine shell and the turbine hub according to a further embodiment of the present invention.
Figure 5:
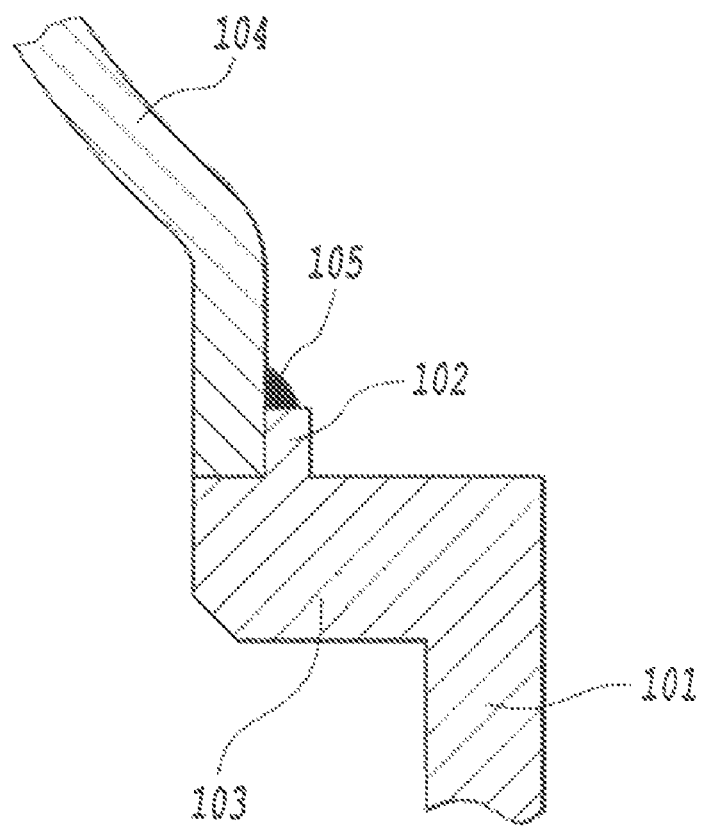
FIG. 5 is an extracted enlarged cross-sectional view of a welded portion between the turbine shell and the turbine hub according to the conventional torque converter.

The joint structure of the turbine hub 15 with the turbine shell 22 may be modified, in a manner other than the embodiment described above. For example, a modification is shown in FIGS. 3 and 4 in accordance with the internal structure of the fluid coupling. FIGS. 3 and 4 illustrate extracted enlarged cross-sectional views of the joint portion 14 of the turbine hub 15 with the turbine shell 22, wherein members having the same functions as those of the above-described embodiment are indicated by the same reference numerals. In the embodiment shown in FIG. 3, the contact surfaces 23 and 24 are extended in parallel to the rotational axis 10a of the torque converter 10 in the same manner as in the above-described embodiment. In this case, the contact surface 24 is formed at an outer peripheral portion of the turbine hub 15 along the rotational axis 10a of the torque converter 10 on the part closer to the pump blade 18; i.e., on the outer peripheral surface of the rib 15a projected toward the stator 25, whereby the joint portion 14 is formed by welding. In the embodiment shown in FIG. 4, the contact surfaces 23 and 24 are defined to be inclined to the rotational axis 10a of the torque converter 10 and the joint portion 14 is formed by fillet welding. More concretely, at the inner peripheral portion of the turbine shell 22, a boss 22a is formed to incline diametrically inward relative to the rotational axis 10a of the torque converter 10 to define the contact surface 23 on the inner periphery thereof. At the outer peripheral portion of the turbine hub 15, a rib 15d having a contact surface 24 on the outer peripheral portion is formed to incline diametrically outward relative to the rotational axis 10a of the torque converter 10. The joint portion 14 is formed at an end of the boss 22a and the rib 15d on a part closer to the pump blade 18; i.e., closer to the stator 25 (on a left side in the drawing).

In the above-described embodiments, while the boss 22a is formed by bending the inner peripheral portion of the turbine shell 22 with a press operation, it is also possible to adopt a T-shaped cross-sectional structure wherein the turbine shell 22 stands up from the intermediate position of the boss 22a along the rotational axis 10a of the torque converter 10. Even in this case, it is possible to load a large compression stress on the joint portion 14 by extending a position of the up-standing portion of the turbine shell 22 to the pump blade 18 side; i.e., the stator 25 side (on a left side in the drawing).

In either of the embodiments, it is predetermined that the compression stress is loaded to these joint portions when the outer peripheral portion of the turbine shell 22 is elastically deformed toward the blade 18 of the pump impeller 11 (on a left side in the drawing) due to the torque transmission of the fluid coupling.

An input shaft 1 of a gear box (not shown) is connected to the output side rotary element B. The gear box may be, for example, an automatic transmission (AT) using a plurality of planetary gears, or a continuously variable transmission (CVT) using a pair of pulleys having a variable groove width and an endless belt running between the pulleys.

A lockup clutch C actuated by a lockup piston 17 controls a hydraulic pressure of a hydraulic fluid supplied to an engagement side fluid chamber 26 defined between the lockup piston 17 and the pump shell 19. A hydraulic pressure of the hydraulic fluid supplied to a disengagement side fluid chamber 27 is defined between the front cover 12 and the lockup piston 17. Thereby, it is possible to press the frictional plate 16 of the lockup piston 17 to the front cover 12 to be integral therewith so that the front cover 12 is directly coupled to the lockup piston 17, or to maintain the front cover 12 in a partially disengaging state so that the cover 12 slips relative to the frictional plate 16 of the lockup piston 17. More concretely, the difference between the pressure of the hydraulic fluid supplied to the engagement side fluid chamber 26 from a gap between the extension sleeve 20 and the input shaft 1 and the pressure of the hydraulic fluid supplied from a central fluid passage 2 formed inside of a tubular input shaft 1 to the disengagement side fluid chamber 27 is controlled by a hydraulic pressure controller (not shown) so that the lockup piston 17 is displaceable in the direction opposite to the front cover 12; that is, in the direction parallel to the rotational axis 10a of the torque converter 10.

When the vehicle speed is relatively low, the lockup piston 17 is displaced toward the turbine hub 15 so that the front cover 12 is not in contact with the frictional plate 16 of the lockup piston 17; that is, the lockup clutch C is disengaged. As a result, the power from the input-side rotary element A is transmitted to the output-side rotary element B while the torque is increased in intensity via the hydraulic fluid. Usually, such a disengaged state of the lockup clutch C is obtained in a torque amplifying zone wherein the rotation of the stator 25, described later, does not occur.

When the vehicle speed is higher than a predetermined value, the differential pressure of the hydraulic fluid between pressures loaded to opposite surfaces of the lockup piston 17 is operated by using the hydraulic pressure controller (not shown). Thereby, the lockup piston 17 is displaced toward the front cover 12 so that the frictional plate 16 of the lockup piston 17 is in tight contact with the front cover 12. As a result, the input-side rotary element A and the output-side rotary element B are coupled in integral with each other via the lockup clutch C, whereby the driving force of the input-side rotary element A is transmitted to the output-side rotary element B via the lockup clutch C and the damper D. Usually, such an engaged state of the lockup clutch C is obtained in a fluidic coupling zone when the rotary speed of the input-side rotary element A becomes approximately equal to that of the output-side rotary element B to allow the idling of the stator 25.

Further, the slip control to permit slippage of the frictional plate 16 of the lockup piston 17 relative to the front cover 12 is carried out in an intermediate region between the disengagement region and the engagement region of the lockup clutch C.

When an engine has a relatively large output, a plurality of clutch plates may be incorporated between the front cover 12 and the lockup piston 17 to disperse the load applied to the frictional plate 16. The present invention is also applicable to a fluid coupling incorporating therein a lockup clutch of such a structure.

At a shaft end of the tubular input shaft 1, the interior of which defines a passage for automatic transmission fluid or CVT fluid (hereinafter collectively referred to as hydraulic fluid); i.e., a central fluid passage, a cylindrical boss 17a is formed at a diametrical inner end of the lockup piston 17 and projected toward the front cover 12 and supported in a freely slidable manner. In the input shaft 1, a male spline 3 is formed for slidably fitting and supporting a female spline 15c formed on an inner peripheral surface of the turbine hub 15.

The damper D in this embodiment is disposed between the turbine hub 15 and the lockup piston 17 and includes a pair of annular dive plates 29 and 30 integrally coupled with the lockup piston 17 of the lockup clutch C via the rivet 28, an annular driven plate 32 forming a female spline 31 on the outer peripheral surface of a boss 32a to be engaged with a male spline 15d formed on the outer peripheral surface of the turbine hub 15, and a plurality of coil spring units 33 arranged for bridging the drive plates 29 and 30 and the driven plate 32. The damper D is displaceable integrally with the lockup piston 17 in a direction parallel to the rotational axis 10a. In this case, the boss 32a of the driven plate 32 abuts the turbine shell 22 opposite thereto so that the displacement toward the turbine shell 22 is limited. The coil spring units 33 in this embodiment consist of an outside coil spring 33a having a thick wire diameter to provide a strong spring force and an inside coil spring 33b having a thinner wire diameter to provide a weaker spring force than the spring 33a.

In the pair of drive plates 29 and 30 and the driven plate 32 disposed therebetween, cutouts 34 and 35 are respectively formed for accommodating the coil spring units 33. Widths of these cutouts 34 and 35 in the circumferential direction approximately correspond to a free length of the outside coil spring 33a, while opposite end surfaces of the outside coil spring 33a abut to lateral end surfaces of the respective cutouts 34 and 35 opposite to each other in the rotary direction of the drive plates 29 and 30 and the driven plate 32. According to this embodiment, a free length of the inside coil spring 33b is defined to be shorter than that of the outside coil spring 33a, so as to ensure a nonlinear spring characteristic is obtainable.

The lockup piston 17 is displaceable together with the drive plates 29 and 30, the driven plate 32 and the coil spring units 33 in a direction parallel to the rotational axis 10a of the torque converter 10 (in the left and right direction in FIG. 1). Power transmission between the drive plates 29 and 30 and the driven plate 32 is carried out via the coil spring units 33. That is, the torque fluctuations generated in the drive plates 29 and 30 causes relative rotation between the drive plates 29 and 30 and the driven plate 32, and at that time, the coil spring units 33 are compressed to absorb strong torque fluctuation. This embodiment has a nonlinear characteristic wherein the outside coil spring 33a is first compressed to enable the relative rotation of the drive plates 29 and 30 to the driven plate 32, and if a larger torque variation occurs, the inside coil spring 33b is also compressed.

In the cutout 34 of the drive plate 29 farther from the lockup piston 17, a spring receiver 36 is formed for preventing the coil spring units 33 from coming out of the cutout 34, and the same function is provided on an end surface of the lockup piston 17. That is, the coil spring units 33 are retained between the lockup piston 17 and the spring receiver 36 of the inside drive plate 29 in a direction parallel to the rotational axis 10a of the torque converter 10.

The torque converter 10 in this embodiment further includes a stator 25 located between the turbine runner 13 and the pump impeller 11, a one-way clutch 37 permits the stator 25 to rotate solely in the same direction as that of the turbine runner 13 or others.

The stator 25 is held on a casing of the gear box (not shown) via the one-way clutch 37 and guides the hydraulic fluid flowing into the turbine runner 13 of the output-side rotary element B by the pump impeller 11 of the input-side rotary element A and again to the pump impeller 11, whereby the well-known increase in torque is achieved.

The one-way clutch 37 in this embodiment has an inner race 38 formed on the inner peripheral surface of the female spline 38a engaged with the male spline 5 formed at a front end of a supporting tube 4 constituting part of the gear box casing (not shown). An outer race 40 is integral with an annular holder 39 press-fit to the inner periphery of the stator 25. Sprags 41 are held between the inner race 38 and the outer race 40, and a holding plate 42 is coupled to the holder 39 on the outer periphery thereof for clipping the inner race 38, the sprags 41 and the outer race 40. Thrust bearings 43 are intervened between the turbine hub 15, the extension sleeve 20, and the one-way clutch 37, respectively, to enable relative rotation of the one-way clutch 37 to the extension sleeve 20 and the turbine hub 15.

It is possible to adopt other well-known structures for the above-described one-way clutch 37 using the sprag 41. In the above-described embodiment, while the fluid coupling according to the present invention is applied to a vehicle torque converter, it is of course possible to apply the same to a fluid coupling which does not increase the driving torque. In such a case, the fluid coupling may dispense with the lockup clutch and the damper.

The invention claimed is:

1. A fluid coupling comprising:
an input-side rotary element coupled with an input member, said input-side rotary element including a pump blade; and
an output-side rotary element including a turbine shell having a turbine blade opposed to said pump blade, and a turbine hub coupled with an output member, said turbine hub being welded to an inner peripheral portion of said turbine shell;
wherein said turbine shell and said turbine hub have contact surfaces, respectively, extending along a rotational axis of said fluid coupling, and
wherein a joint portion is formed by welding on said contact surfaces closer to said pump blade,
wherein said turbine shell has a boss at an inner peripheral portion thereof, said boss extending in the direction parallel to the rotational axis of said fluid coupling; an inner peripheral surface of said boss defining said contact surface of the turbine shell, and
wherein said turbine hub has an annular groove at an outer peripheral portion thereof, said boss being inserted into said annular groove; an inner peripheral surface of said annular groove defining the contact surface of the turbine hub.

2. A fluid coupling comprising:
an input-side rotary element coupled with an input member, said input-side rotary element including a pump blade; and
an output-side rotary element including a turbine shell having a turbine blade opposed to said pump blade, and a turbine hub coupled with an output member, said turbine hub being welded to an inner peripheral portion of said turbine shell;
wherein said turbine shell and said turbine hub have contact surfaces, respectively, extending along a rotational axis of said fluid coupling, and
wherein a joint portion is formed by welding on said contact surfaces closer to said pump blade,
wherein said turbine shell has a boss at an inner peripheral portion thereof, said boss extending in the direction parallel to the rotational axis of said fluid coupling; an inner peripheral surface of said boss defining said contact surface of the turbine shell, and
wherein said turbine hub has a wall and a rib at the outer peripheral portion thereof, said rib extending from the wall in the direction parallel to the rotational axis of said fluid coupling, the rib extending beyond an inner peripheral surface of the wall; an outer peripheral surface of said rib defining said contact surface of the turbine hub.

3. A fluid coupling comprising:
an input-side rotary element coupled with an input member, said input-side rotary element including a pump blade; and
an output-side rotary element including a turbine shell having a turbine blade opposed to said pump blade, and a turbine hub coupled with an output member, said turbine hub being welded to an inner peripheral portion of said turbine shell;
wherein said turbine shell and said turbine hub have contact surfaces, respectively, and wherein a joint portion is formed by welding on said contact surfaces closer to said pump blade, wherein said turbine shell has a boss at an inner peripheral portion thereof, said boss being diametrically inclined inward relative to the rotational axis of said fluid coupling; an inner peripheral surface of said boss defining said contact surface of the turbine shell, and wherein said turbine hub has a rib at an outer peripheral portion thereof, said rib being diametrically inclined outward relative to the rotational axis of said fluid coupling; an outer peripheral surface of said rib defining said contact surface of the turbine hub.

4. A fluid coupling comprising:

an input-side rotary element coupled with an input member, and including a pump blade; and an output-side rotary element including a turbine shell provided with a turbine blade opposed to said pump blade and a turbine hub coupled with an output member, said turbine shell being coupled to said turbine hub via a joint portion;

wherein said turbine shell is welded to said turbine hub so that said joint portion receives a compression stress when said turbine shell is displaced toward said pump blade as torque is transmitted by said fluid coupling, wherein said turbine shell has a boss at an inner peripheral portion thereof, extending in a direction parallel to the rotational axis of said fluid coupling; an inner peripheral surface of said boss forming a contact surface, and wherein said turbine hub has an annular groove at an outer peripheral portion thereof, said boss being inserted into said annular groove; an inner surface of said annular groove defining a contact surface.

5. A fluid coupling comprising:

an input-side rotary element coupled with an input member, and including a pump blade; and an output-side rotary element including a turbine shell provided with a turbine blade opposed to said pump blade and a turbine hub coupled with an output member, said turbine shell being coupled to said turbine hub via a joint portion;

wherein said turbine shell is welded to said turbine hub so that said joint portion receives a compression stress when said turbine shell is displaced toward said pump blade as torque is transmitted by said fluid coupling, wherein said turbine shell has a boss at an inner peripheral portion thereof, said boss extending in a direction parallel to the rotational axis of said fluid coupling; an inner peripheral surface of said boss forming a contact surface, and wherein said turbine hub has a wall and a rib at an outer peripheral portion thereof, said rib extending from the wall in the direction parallel to the rotational axis of said fluid coupling, the rib extending beyond an inner peripheral surface of the wall; an outer peripheral surface of said rib forming said contact surface.

6. A fluid coupling comprising:

an input-side rotary element coupled with an input member, and including a pump blade; and an output-side rotary element including a turbine shell provided with a turbine blade opposed to said pump blade and a turbine hub coupled with an output member, said turbine shell being coupled to said turbine hub via a joint portion;

wherein said turbine shell is welded to said turbine hub so that said joint portion receives a compression stress when said turbine shell is displaced toward said pump blade as torque is transmitted by said fluid coupling, wherein said turbine shell has a boss at an inner peripheral portion thereof, said boss being inclined diametrically inward relative to the rotational axis of said fluid coupling; an inner peripheral surface of said rib forming a contact surface, and wherein said turbine hub has a rib at an outer peripheral portion thereof, said rib being inclined diametrically outward relative to the rotational axis of said fluid coupling; an outer surface of said rib forming a contact surface.

7. The fluid coupling as claimed in any one of claims 1 to 3 and 4 to 6, wherein said turbine shell extends from said boss on a part thereof closer to said pump blade while being inclined diametrically outward.

8. The fluid coupling as claimed in claim 7, further comprising a lockup clutch including a lockup piston coupled to said output-side rotary element, said lockup clutch being capable of engaging said lockup piston to said input-side rotary element integral therewith without intervening fluid.

9. The fluid coupling as claimed in claim 8, further comprising a damper having first rotary element coupled to said turbine hub, a second rotary element coupled to said lockup piston to be rotatable relative to said first rotary element, and an elastically deformable member incorporated between said first and second rotary elements to allow the relative rotation of said first and second rotary elements so that elastic deformation occurs due to said relative rotation.

10. The fluid coupling as claimed in any one of claims 1 to 3 and 4 to 6, further comprising a lockup clutch including a lockup piston coupled to said output-side rotary element, said lockup clutch being capable of engaging said lockup piston to said input-side rotary element integral therewith without intervening fluid.

11. The fluid coupling as claimed in claim 10, further comprising a damper having a first rotary element coupled to said turbine hub, a second rotary element coupled to said lockup piston to be rotatable relative to said first rotary element, and an elastically deformable member incorporated between said first and second rotary elements to allow the relative rotation of said first and second rotary elements so that elastic deformation occurs due to said relative rotation.

12. A method for connecting an inner peripheral portion of a turbine shell of a fluid coupling to an outer peripheral portion of a turbine hub of said fluid coupling, said fluid coupling comprising an input-side rotary element coupled to an input member and including a pump blade, and an output-side rotary element including said turbine shell including a turbine blade opposed to said pump blade, and said turbine hub is coupled to an output member, the method comprising:

a step of welding said turbine shell to said turbine hub so that a joint portion between said inner peripheral portion of said turbine shell and said outer peripheral portion of said turbine hub receives a compression stress when said turbine shell is displaced toward said pump blade as the torque is transmitted by said fluid coupling, wherein said turbine shell has a boss at an inner peripheral portion thereof, extending in a direction parallel to the rotational axis of said fluid coupling; an inner peripheral surface of said boss forming a contact surface, and wherein said turbine hub has an annular groove at an outer peripheral portion thereof, said boss being inserted into said annular groove; an inner surface of said annular groove defining a contact surface, and wherein the compression stress is received by the turbine hub from the turbine shell through the contact surfaces of the turbine hub and turbine shell, respectively.

* * * * *